United States Patent [19]

Mottin et al.

[11] Patent Number: 5,828,408

[45] Date of Patent: Oct. 27, 1998

[54] DEVICE FOR READING DETECTOR ARRAYS WITH TDI EFFECT

[75] Inventors: Eric Mottin, Le Vimaux; Philippe Pantigny, Claix, both of France

[73] Assignee: Commissariat A L'Energie Atomique, Paris, France

[21] Appl. No.: 764,267

[22] Filed: Dec. 12, 1996

[30] Foreign Application Priority Data

Jan. 4, 1996 [FR] France ................................. 96 00045

[51] Int. Cl.$^6$ .................................................. H04N 3/14
[52] U.S. Cl. ........................................... 348/295; 348/308
[58] Field of Search ............................ 348/295; 250/558, 250/332, 334

[56] References Cited

U.S. PATENT DOCUMENTS

| | | | |
|---|---|---|---|
| 3,808,435 | 4/1974 | Bate et al. | 250/332 |
| 4,054,797 | 10/1977 | Milton et al. | 250/332 |
| 4,609,823 | 9/1986 | Berger et al. | 250/332 |
| 4,695,889 | 9/1987 | Portmann | 348/311 |
| 4,728,804 | 3/1988 | Norsworthy | 348/164 |
| 4,744,057 | 5/1988 | Descure et al. | 348/295 |
| 4,831,621 | 5/1989 | Coutures | 370/533 |
| 5,014,131 | 5/1991 | Reed et al. | 348/295 |
| 5,043,924 | 8/1991 | Hofmann . | |
| 5,315,114 | 5/1994 | Kansy et al. . | |

FOREIGN PATENT DOCUMENTS

| | | |
|---|---|---|
| 0 660 600 | 6/1995 | European Pat. Off. . |

OTHER PUBLICATIONS

Martin, et al., "Time Division Multiplexed Time Delay Integration", *Infrared Detectors and Arrays* — pp. 26–43, vol. 930 (1988).

*Primary Examiner*—Thai Tran
*Assistant Examiner*—Aung S. Moe
*Attorney, Agent, or Firm*—Burns, Doane, Swecker & Mathis, LLP

[57] ABSTRACT

A device for reading detector arrays with TDI effect comprises an assembly of lines of detectors each integrating its own contribution during an integration time, with each contribution corresponding to an image in one of an array of elementary circuits. A demultiplexer directs the contribution of each detector into a first elementary circuit determined by this detector and the number of the current image. A summing device, executes the sum of the contribution of the detectors consisting in choosing, for each detector, a second elementary circuit determined in function of the number of the current image and of the detector considered and in executing the sum of these elementary circuits so as to carry out the TDI effect on the detectors in such a manner as to obtain the contribution of the detector line.

10 Claims, 6 Drawing Sheets

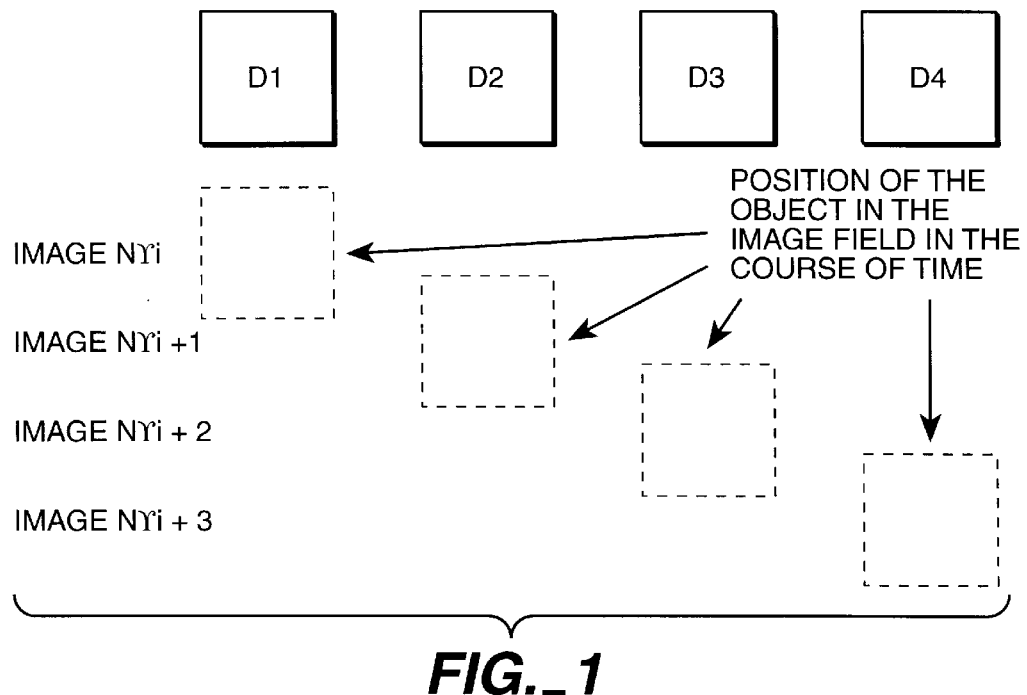
FIG._1
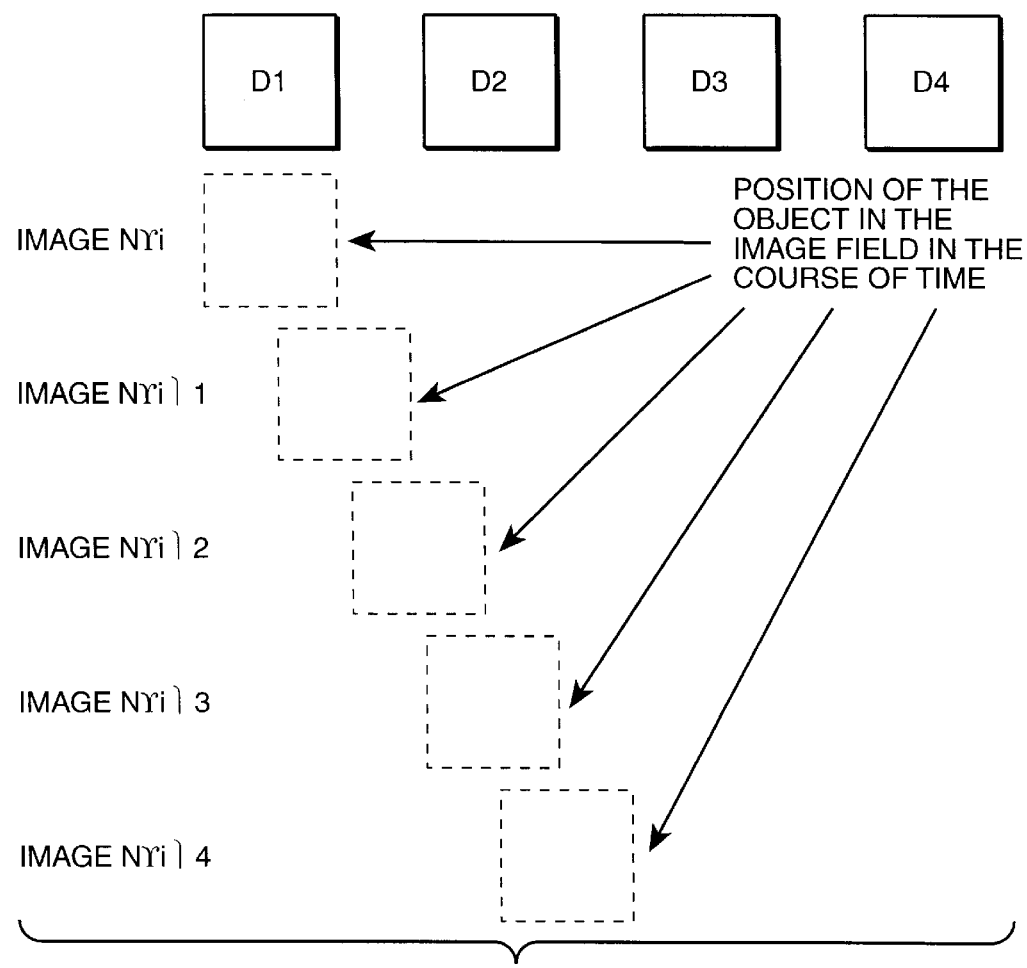
FIG._2

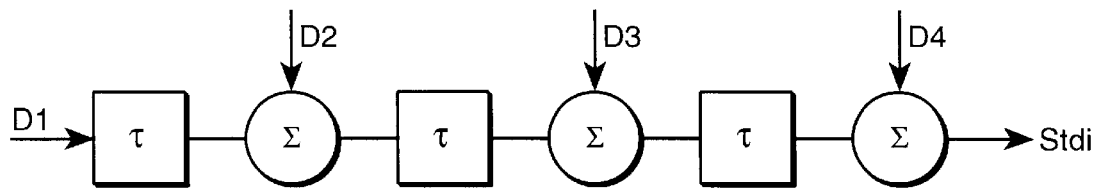
FIG._3
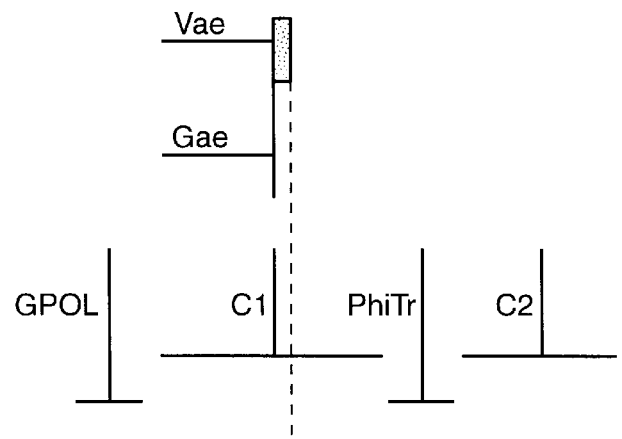
FIG._4
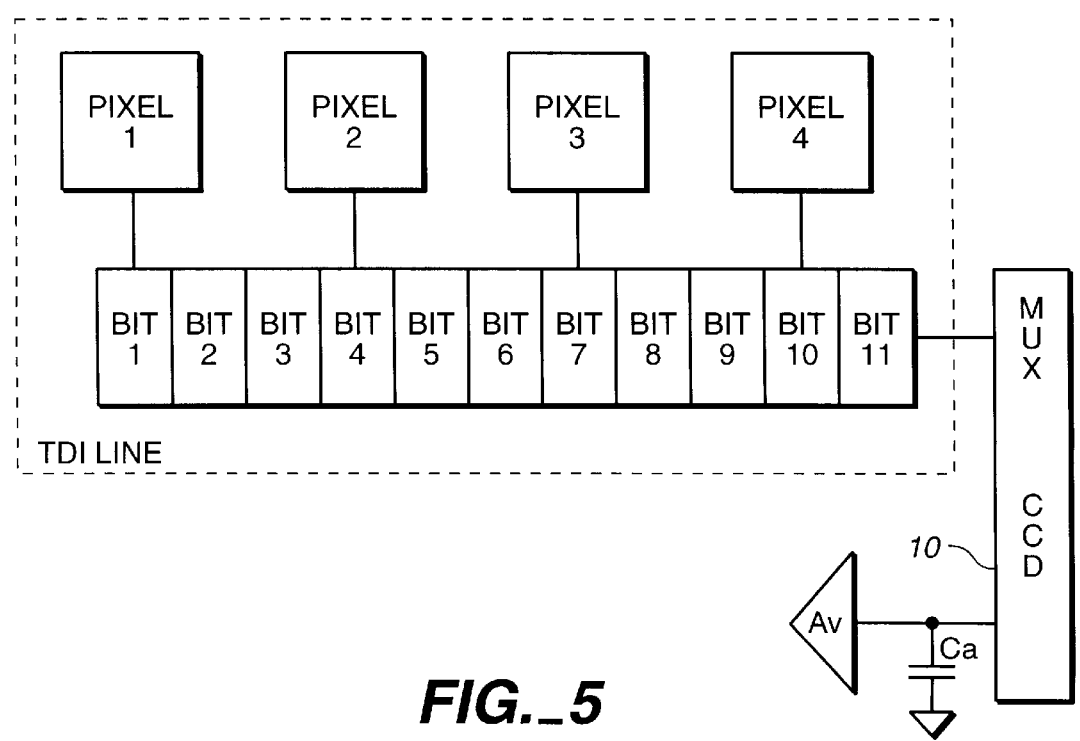
FIG._5

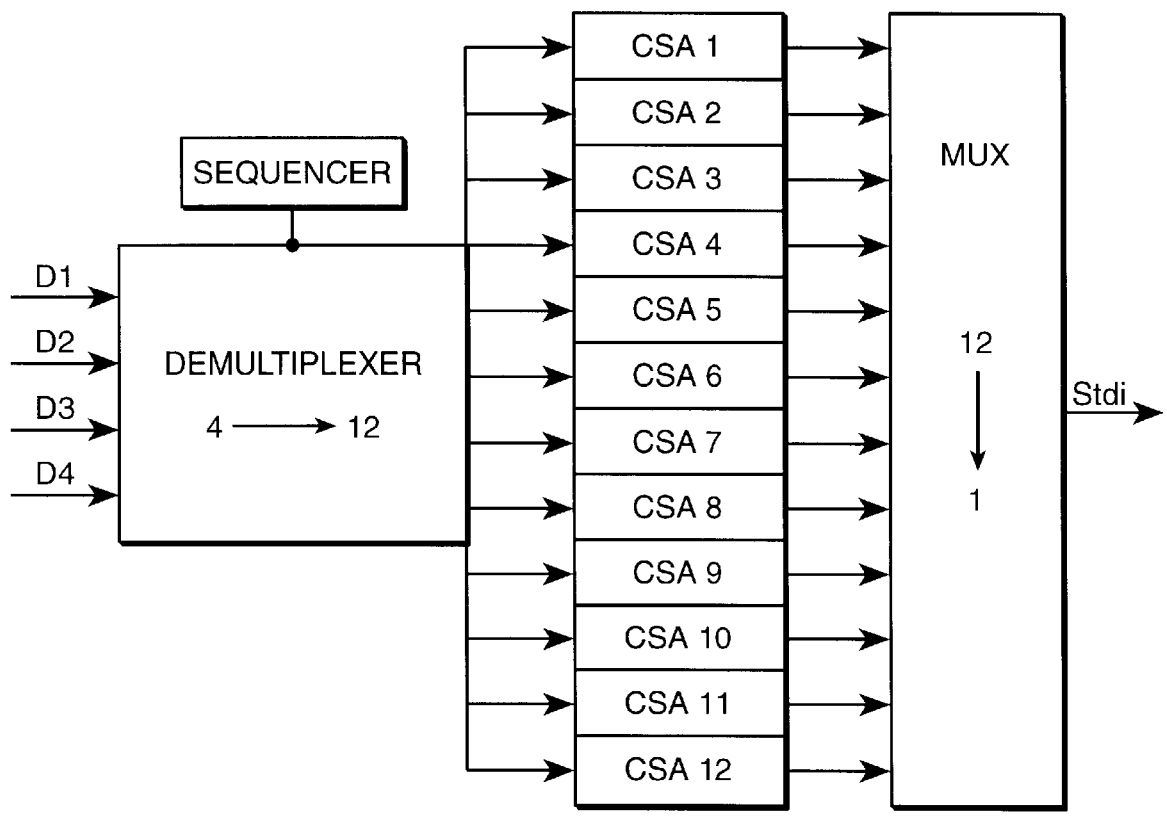
FIG._6
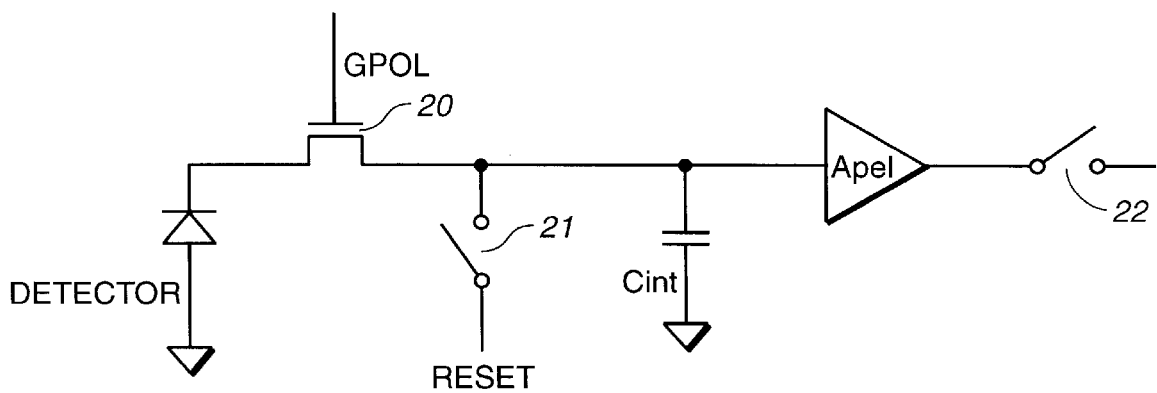
FIG._7

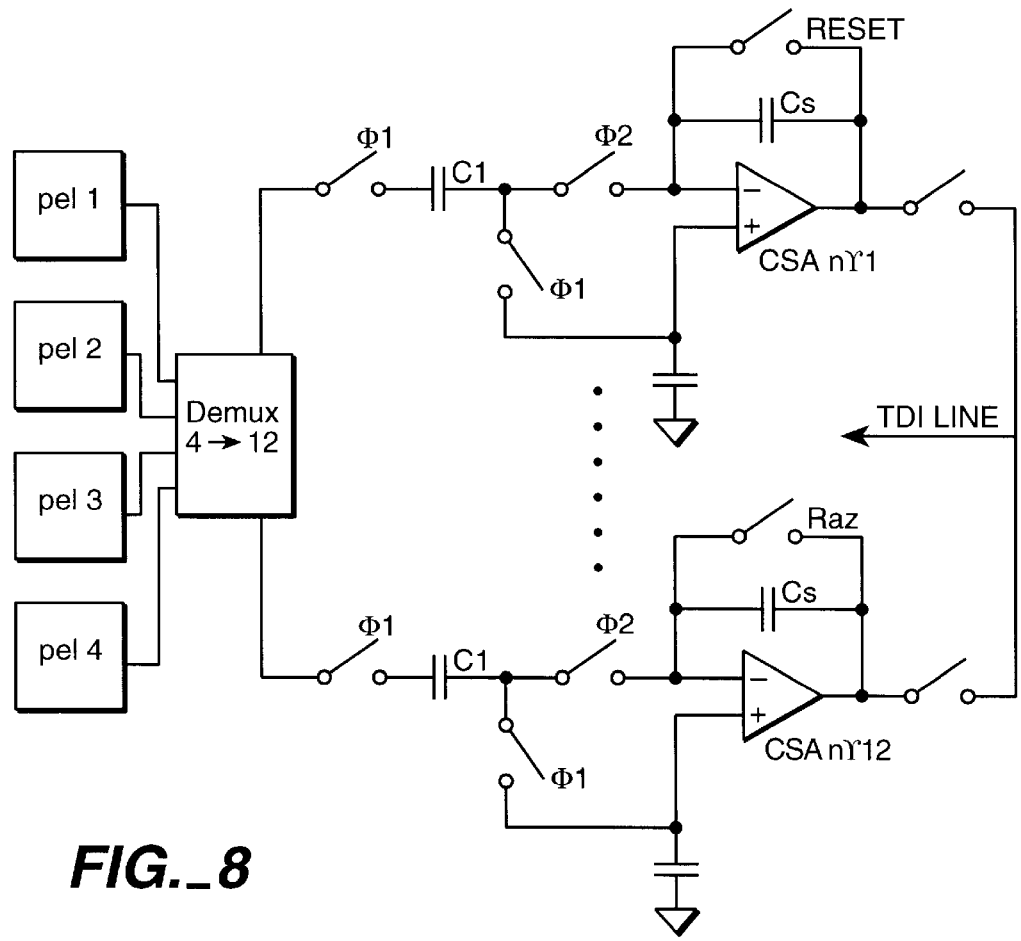
FIG._8
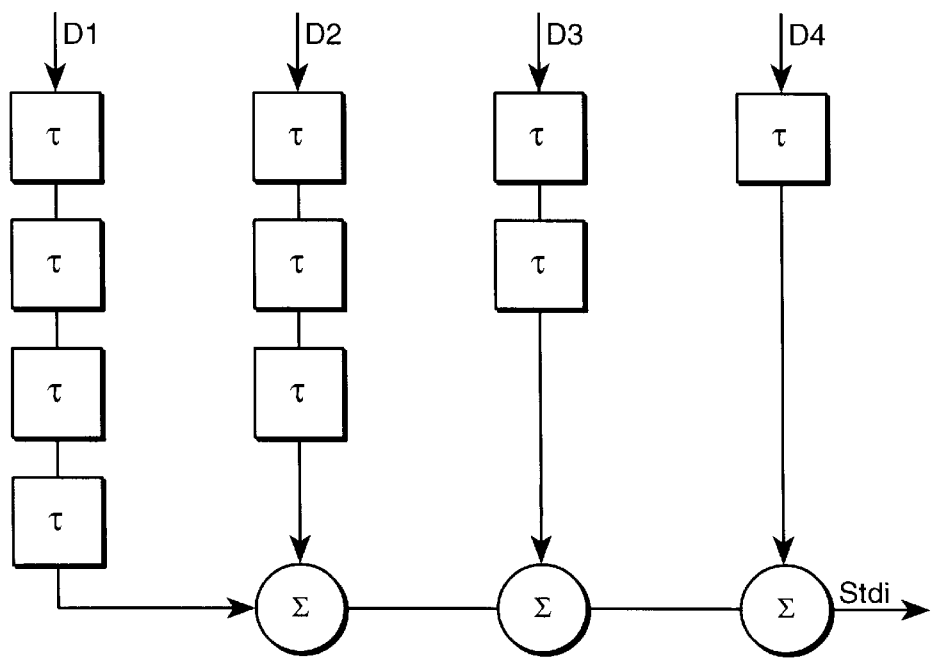
FIG._9

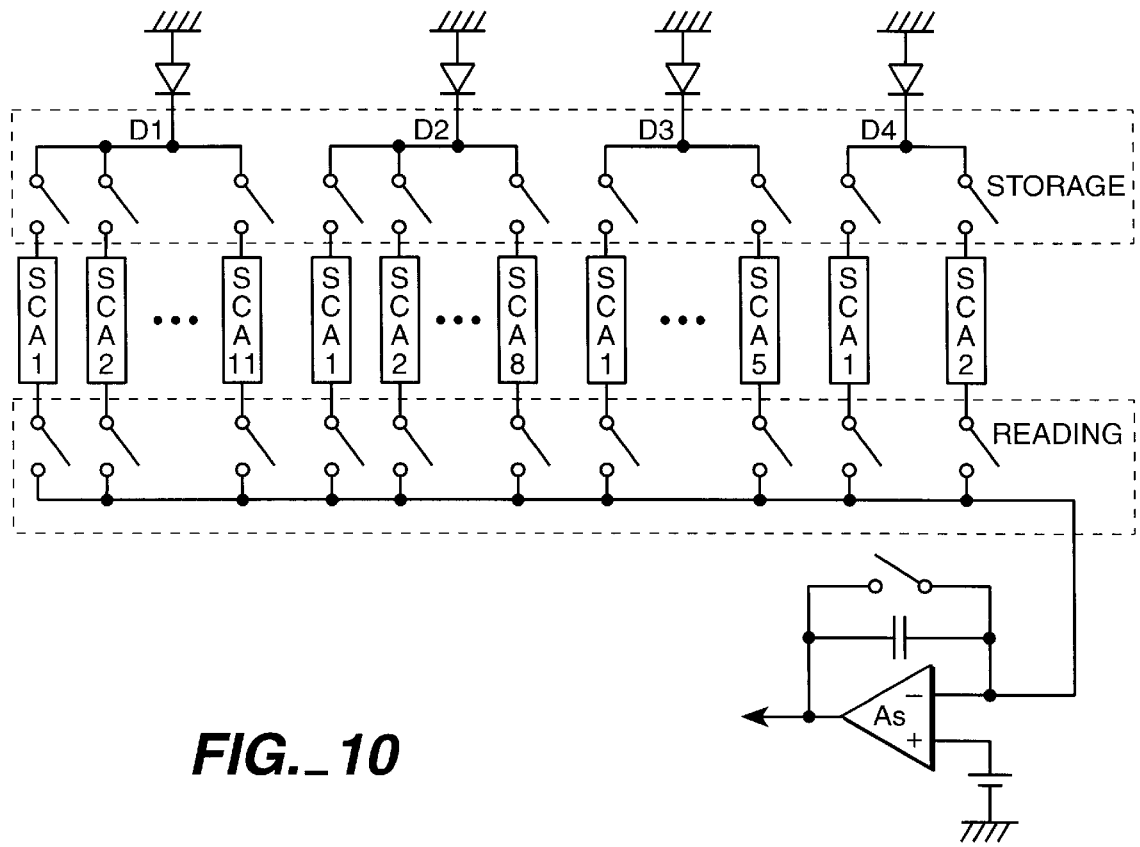
FIG._10
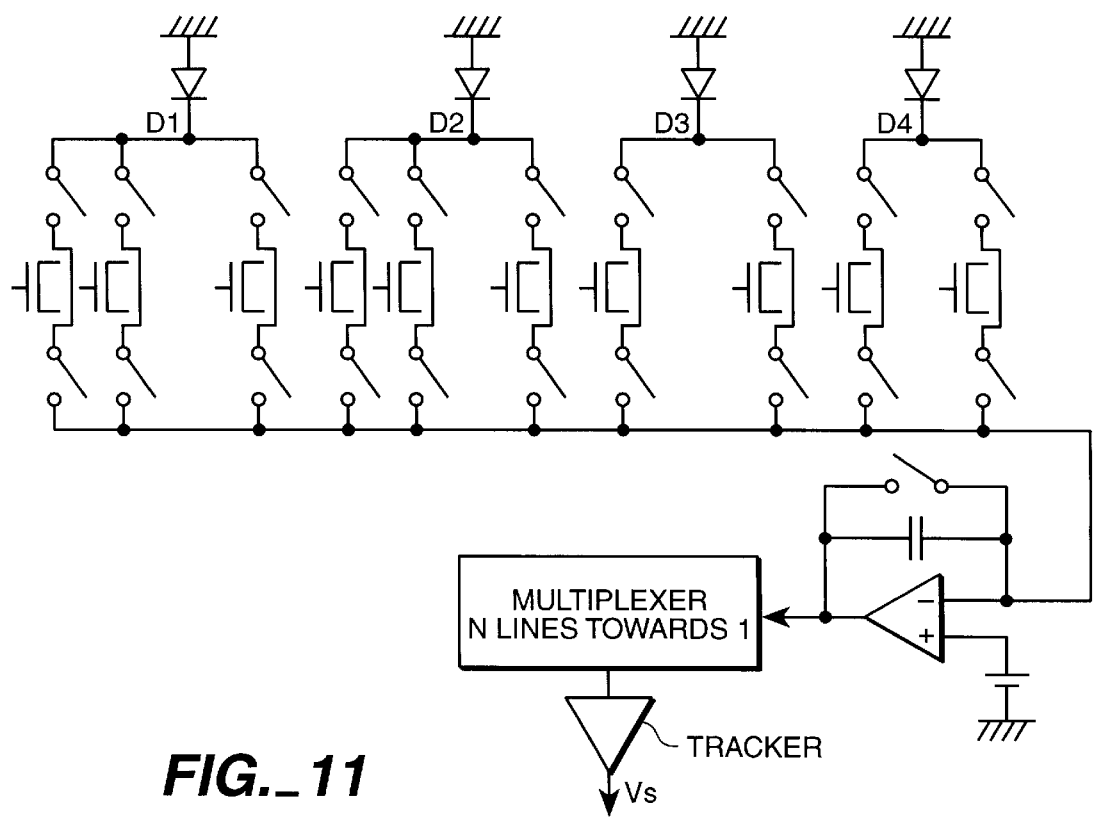
FIG._11

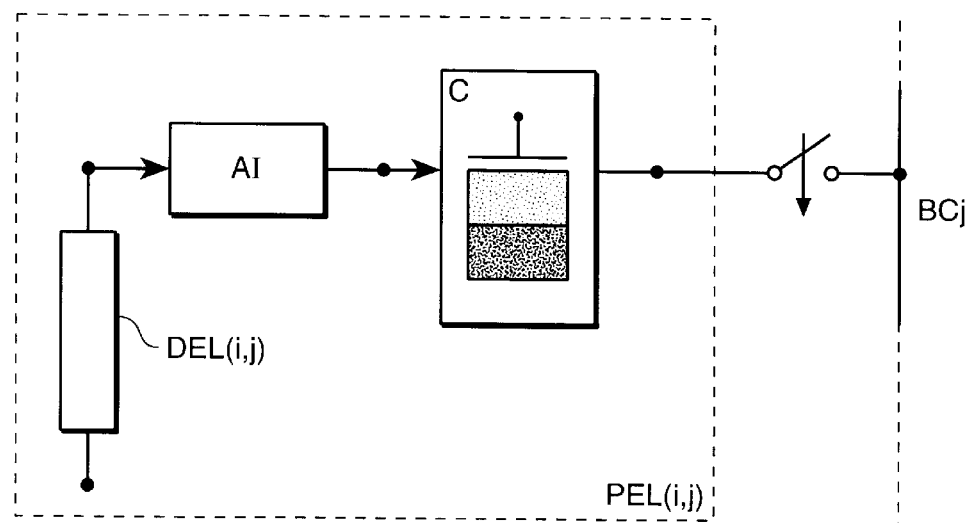
FIG._12A
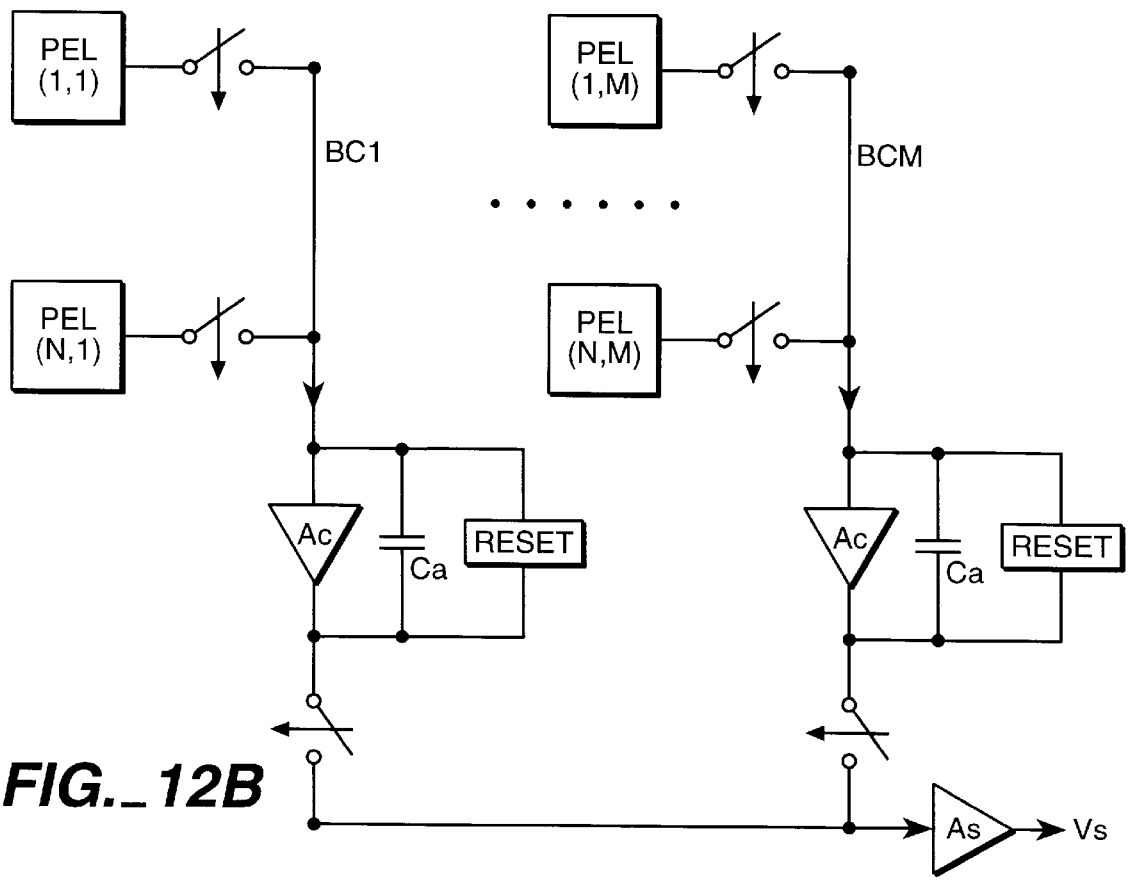
FIG._12B

DEVICE FOR READING DETECTOR ARRAYS WITH TDI EFFECT

DESCRIPTION

1. Technical field

This invention relates to a device for reading detector arrays with TDI (Time Delay Integration) effect.

The domain under consideration is that of radiation detection devices, in particular radiation emitted to infrared, visible light and X-ray wavelengths.

The invention more specifically concerns the architecture of reading circuits whose photosensitive elements are read by optical scanning of the field of observation.

2. State of the prior art

The photonic detection devices concerned by the invention are of the quantum type. With quantum detectors, the photons received by the detector are converted into electrons and/or holes according to the principle of intrinsic detection (transition from valence band to direct conduction band) or extrinsic detection (transition between intermediate level and conduction band). Quantum detectors may be divided into two categories:

- photovoltaic detectors whose current intensity varies in function of the incident flux;
- photoconductive detectors whose resistance varies in function of the incident flux.

Quantum detectors may thus be assimilated to a current generator, more or less ideal, which delivers a current whose intensity varies in function of the flux incident provided that these detectors are suitably polarized.

In the cameras under consideration here, the images are produced from arrays of detectors. A camera's field of observation is scanned by an optical device so as to form an image.

In view of the number of detectors used in current cameras, and given the pitch of the detectors, it is absolutely essential to use a specific circuit, henceforth referred to as reading circuit, in order to condition the signal delivered by the detection circuit and the multiplexer towards a restricted number of information processing chains.

The detection circuit may be carried out directly on the reading circuit or on another circuit. The former circuit is referred to as a monolithic component and the latter as a hybrid component since the detectors of the detection circuit are interconnected to the input stages of the reading circuit by such adapted technologies as hybridization by balls.

The principle of optical scanning for obtaining an image is as follows:

An optical device of the rotating mirror type scans the scene at a speed $V_{bal}$ so as to obtain a matrix image.

The number of lines $N_{lig}$ of this image is equal to the number of detectors $Di$ of the array. The number of columns $COLj$ of the image is:

$$N_{col} = \frac{L. \text{Tint}}{V_{bal}}$$

where:

L is the width of the field of observation,

Tint is the exposure time for acquiring a column of the image, $V_{bal}$ is the scanning speed.

The shortcoming of the scanned array reading mode is essentially due to the fact that the exposure time for each column COLj is limited. This restricts performances in terms of signal-to-noise ratio. Moreover, if, for technological reasons, the array has one or more defective detectors, this will lead to the presence of one or more dead lines on the image.

As a way of getting round this disadvantage, arrays with TDI (Time Delay Integration) effect are used.

The invention concerns a reading circuit architecture which is particularly adapted to the reading of detector arrays with such a TDI effect. There is, in fact, a category of cameras in which the image is formed by the optical scanning of a mosaic of detectors. The number of lines of this mosaic depends on the format of the image and the number of columns is such that it improves the signal-to-noise ratio of the camera. This is obtained by adding the information delivered by the detectors of a same line of mosaic to delayed and synchronous times of optical scanning. In the English literature this mode of information reading is referred to as Time Delay Integration.

This mode of reading consists of replacing the contribution of one detector by the contribution of several detectors added to each other. Thus the equivalent integration time for the image shot is multiplied by the number of detectors participating in the TDI effect.

In order to produce the TDI effect, a supplementary scan must be added to the scan required to form the image. This scan is illustrated in FIG. 1.

The pixel resulting from the TDI effect is obtained by adding the contribution of the detectors to the following times:

Pixel $N_1$=D1 (image $n°i$)+D2 (image $n_{i+1}$)+D3 (image $n_{i+2}$)+D4 (image $n_{i+3}$)

This makes it possible to improve the signal-to-noise ratio of the camera. In fact, this ratio is improved by the factor: $\sqrt{N_{TDI}}$ where $N_{TDI}$ is the number of detectors on which the TDI effect occurs.

The TDI effect may be produced with a given rate of optical supersampling. FIG. 2 represents an optical supersampling rate of 3. To obtain the pixel with TDI effect, this gives the following relation:

Pixel $N_1$=D1 (image $n_i$)+D2 (image $n_{i+3}$)+D3 (image $n_{i+6}$)+D4 (image $n_{i+9}$).

This makes it possible to improve the modulation transfer function (MTF) of the camera, in other words its spatial resolution.

In the ensuing description, this example of TDI on four detectors with an optical supersampling rate of 3 will be used. The invention described here is applied to a reading circuit architecture which is specifically adapted to array reading with TDI effect.

Devices for reading detector arrays with TDI effect fall into two categories:

- charge transfer devices, produced by specific technologies with low integration density;
- CMOS devices, requiring the use of an integrator in commuted capacity? for each analog summation cell. This integrator is very bulky and dissipates a lot of energy.

Reading circuits of the charge transfer device type

These reading circuits are fabricated in systems specially adapted to the production of charge transfer devices.

The functional diagram of the CCD architecture is given in FIG. 3.

This diagram represents a pixel obtained by TDI effect on four detectors without optical supersampling. Supersampling for this architecture consists in inserting as many delay cells ($\tau$) as supersamples before adding ($\Sigma$) the information to the others.

The organization of the reading circuit breaks down into two parts:
- elementary circuit where the integration of the detector current is produced;
- multiplexing and summation of the information in order to produce the TDI effect.

FIG. 4 illustrates the functional diagram of the elementary circuit.

Each elementary circuit comprises:
- an impedance matching device Gpol between the detector and the MOS condenser;
- an MOS condenser, G, whose inversion channel is used as storage site;
- a switch PhiTr controlling the injection of the charges stored in the channel of a charge transfer register.

The block diagram of the multiplexer providing the TDI effect is represented in FIG. 5.

The multiplexing and summation of the charges stored in the elementary circuits is carried out by means of a charge transfer register.

At the end of this register the charge packet sequenced in the register contains a pixel with TDI effect on N detectors. Next, a parallel register which multiplexes towards the circuit output stage(s) is found.

In operation, at each frame, the inversion channel of the integration condenser is emptied of any charge by means of the resetting device. The current delivered by each detector of the array is then integrated during the exposure time in the inversion channel of the integration condenser.

The integrated charge $Qpel_{L,c}$ in the storage capacity C1 of the elemental point n(L,C) is connected to the intensity $Id_{l,c}$ of the current delivered by the detector n(L,C) and to the exposure time by the relation:

$$Qpel_{l,c} = Id_{l,c} \times Texposure$$

L representing the number of the detection line and C representing the number of the detector in the detection line.

All or part of the charge stocked in these integration condensers is then transferred to the charge transfer register which produces the TDI effect.

The TDI pixel is obtained by performing the following summation:

$$Qtdi_L = \sum_{c=1}^{Nb\_det} Qpel_{1,c}$$

In output of this TDI register the charges are multiplexed by a parallel register 10 towards the output stage. In this output stage the charges are converted into voltage by injection in a suitably polarized capacitance Cs. The voltage at the terminals of this condenser is read by a voltage amplifier Av with a very strong input impedance and a very weak output impedance.

The expression of the amplitude $\delta Vs_i$ of the output voltage pulse corresponding to the reading of the line of detectors n° (L) is given by the expression:

$$\delta Vs_i = \frac{Aq}{Cs} \cdot \sum_{c=1}^{Nb\_det} Qpel_{1,c}$$

where Cs is the voltage charge conversion factor of the output stage and Aq the charge gain of the circuit.

The advantage of these reading circuits lies in the simplicity of their conception, since the TDI effect is here produced in charge. In point of fact, the delayed addition of charge packets between each other is inherent in the working principle of a charge transfer register.

The TDI scanning is monodirectional. The detectors cannot be scanned in both directions for reasons of topology. The parallel register is implantable on one side only.

Finally, these reading circuits have a major disadvantage in that they have to be fabricated in specific systems whose integration density is less than those of standard CMOS systems. Moreover, design aid tools for these tools are much less developed than for CMOS systems.

CMOS-type reading circuits

The block diagram of the architecture is given in FIG. 6, each CSA cell being an analog summation cell.

The diagram gives the architectural principle of the reading circuit. There are twelve analog memories allowing the construction in the course of time of the TDI pixel by successive addition of the contributions of each detector. The demultiplexer 4 towards 12 makes it possible, in the course of time, to direct the contributions of each diode into the summation memories. In practice, it is this sequencing which produces the TDI effect.

The organization of the reading circuit for a TDI on four detectors with a supersampling of three breaks down into two parts:
- the elementary circuit where the detector current is integrated and converted into voltage;
- the multiplexing and the summation of the voltages in an analog memory so as to produce the TDI effect.

Each elementary circuit spot includes at least:
- an impedance matching device between the detector and the integration condenser;
- a condenser carried out by means of an MOS transistor whose gate-to-source capacitance makes it possible to convert the current into voltage by integration;
- a reinitialization switch 21 of the integration condenser at each frame, carried out by means of MOS transistors;
- a voltage amplifier Apel with high input impedance or the reading of the voltage at the terminals of the integration condenser Cint and for low-impedance attacking of the output amplifier;
- a switch 22 for multiplexing this voltage towards one of the twelve memorization sites.

This elementary circuit spot is represented in FIG. 7.

The part producing the TDI function for the line of four detectors Pel1, Pel2, Pel3, Pel4 comprises:
- twelve integrators CSA1 to CSA12 of commuted-capacitance type for producing the voltage summation and the memorization of the TDI pixels thus obtained;
- for each integrator, a resetting device reinitializing the summation capacitance once the TDI pixel has been obtained through successive summations;
- a demultiplexer (Demux) 4 towards 12 for the time sequencing of information so as to produce the TDI summation;
- a switch per output of each integrator in order to multiplex the 12 integration sites on one path so as to obtain the TDI information corresponding to a line of detectors.

The block diagram of this function is represented in FIG. 8.

The expression of the amplitude $\delta Vs_1$ of the output voltage pulse corresponding to the reading of the detector line n° (L) is given by the expression:

$$\delta V s_1 = \frac{C1}{Cs} \cdot \sum_{c=1}^{Nb\_det} Qpel_{1,c}$$

where C1/Cs is the gain factor of the voltage summing device.

The sequencing of the detector information in order to obtain the TDI effect is described at the end of this description in Table I in which the detector information is directed into the summation cells.

The advantage of this type of architecture is that it can be carried out in currently available systems benefiting from considerable investment in research and development.

This architecture requires the use of an integrator in commuted capacitance for each analog summation cell. These amplifiers are extremely bulky and are wasteful of electrical power. Moreover, as the information from a TDI line is obtained by multiplexing these amplifiers, the quiescent point dispersions of such amplifiers are very inconvenient and merge with the signal of the detector.

The invention concerns the design of a reading circuit incorporating the CMOS technology and capable of reading an array of detectors and producing a TDI effect on several detectors, this circuit being required to respect the following criteria:

low electrical consumption;

compact "layout" in order to improve production capacity;

low sensitivity to spatial technological dispersions, that is to say the threshold voltage of the transistors varies very little in function of the position of the transistor on the chip.

DESCRIPTION OF THE INVENTION

This invention relates to a device for reading detector arrays with TDI effect, characterized in that it comprises:

an assembly of detector lines, each detector being capable of integrating its own contribution during an integration time, each contribution corresponding to an image in an elementary circuit of a network of elementary circuits;

a demultiplexer sequenced in function of the detectors and image numbers, capable of directing the contribution of each detector into a first elementary circuit determined by this detector and the number of the current image;

a summing device capable of executing the sum of the contribution of the detectors consisting in choosing, for each detector, a second elementary circuit determined in function of the number of the current image and of the detector considered and in executing the sum of these elementary circuits so as to carry out the TDI effect on the detectors in such a way as to obtain the contribution of the detector line.

The elementary circuits are advantageously filled and then read by circular permutation, the sequencing being indicated in Tables II and III accompanying this description.

The detectors may be of the quantum type, for example photovoltaic detectors (diodes) or photoconductors.

The detectors may be thermal but, in this case, the invention loses some of its interest due to the weak performance of existing detectors in terms of speed of response.

Each elementary circuit (PEL(i,j)) advantageously comprises:

an impedance matching device (AI; Tp)

an integration and storage device (Cpel; Tc);

an addressing device (Ta).

The impedance matching device is located between the detector under consideration and the integration, storage and charge evacuation device.

The integration, storage and charge evacuation device is carried out y means of at least one MOS transistor whose source and drain are connected to the detector via a switch, and whose gate is controlled by a clock.

The addressing device commutes the source and/or the drain of the MOS transistor onto a connection common to the elementary circuits of a same column, known as the bus column.

The charge amplifier is connected to the end of each bus column, and the multiplexing of the outputs of the charge amplifiers towards at least one output amplifier (Ap) is carried out by at least one switch.

The impedance matching device is advantageously an MOS transistor (Tp).

The addressing device is advantageously an MOS transistor (Ta).

In the CCD devices of the prior art, the final image is the sum of the contributions of all the detectors, successively adding the contribution of the next detector. The final image is given by the last bit of the CCD register.

In the invention, each elementary circuit stores the contribution of a single detector. In order to obtain the TDI pixel corresponding to a detector line, one elementary circuit per detector is emptied into a summing device which carries out the sum of the contributions. This sum is performed in an image time and not, as is the case with devices of the prior art, in a time required to produce the TDI effect.

In the invention, the TDI effect is obtained by carrying out the sum of the contribution of each detector with the next, taking into account an elementary circuit determined in function of the current image and of the detector considered with a delay. This delay is defined by the constraints linked to the picture-taking device and improves spatial resolution in the scanning direction.

Advantageously, the number of memorization cells for the detector n° 1 is given by the following relation:

$$N_{ci} = (N_d - i)\tau + 2$$

where $N_{ci}$ is the number of memorization cells for detector $n_1$.

In the case of a bidirectional TDI device, the number of memorization cells differs according to the detector number in order to allow optical scanning to be carried out in both directions. The number of memorization cells per detector is here as follows:

$$N_{ci} = \mathrm{MAX}\,((N_d-i)\,\tau+2,\,(N_d-i+1))\,\tau+2)$$

The invention relates to a device made by a technological system with high integration density, for example CMOS, capable of reading a detector array and of producing a TDI effect on several detectors. The maximum number of detectors is determined by the interconnection rules of the technology used.

In the device concerned by the invention, the integration of the detection current is accomplished in each elementary circuit and the TDI effect is produced by the multiplexer and the summing device of the contribution of each detector.

The devices of the prior art included a number of memorization cells equal to the product of the number of detectors by the supersampling rate. Each memorization cell was equipped with an amplifier receiving the sum of all the detectors of the TDI pixel. Such devices were consequently unwieldy.

The device concerned by the invention does not contain a memory which is common to all the detectors. Each detector has its own memory. The memory is contained in each elementary circuit and only one amplifier is used for carrying out the summing device function.

The advantage of the invention lies in the fact that:

memorization is performed in the elementary circuit by a transistor. Unlike devices of the prior art, no voltage amplifier is required;

the summing device is an amplifier equipped with a condenser and a resetting device, for example an operational amplifier.

BRIEF DESCRIPTION OF THE DRAWINGS

FIG. 1 shows the supplementary scan required to produce the TDI effect;

FIG. 2 illustrates the TDI effect with a given optical supersampling rate;

FIG. 3 illustrates the working principle of the CCD architecture;

FIG. 4 illustrates the working principle of the elementary circuit;

FIG. 5 illustrates the block diagram of the multiplexer assuring the TDI effect;

FIG. 6 illustrates a block diagram giving the architectural principle of the CMOS-type reading circuit;

FIG. 7 illustrates the block diagram of the elementary circuit;

FIG. 8 illustrates the point carrying out the TDI function for a line of four detectors;

FIG. 9 illustrates the working principle of an embodiment according to the invention;

FIG. 10 illustrates the architecture of the circuit according to the invention;

FIG. 11 illustrates the working principle of a TDI array;

FIGS. 12A and 12B illustrate an architecture of an SCA-type reading circuit.

DETAILED DESCRIPTION OF EMBODIMENTS

The invention provides an architecture in which information is not memorized in order to produce the TDI effect, in other words an analog memory is used to add successively the contribution of each detector. In this solution each detector integrates its own contribution before summation in one or memories provided for this purpose. Next, the TDI effect is obtained by simultaneously directing the contribution of each detector towards a single summation amplifier.

The array is an assembly of N detector lines and M detector columns. In the ensuing description M is taken as being equal to 4.

The working principle for a TDI effect on four detectors D1, D2, D3 and D4 without supersampling is represented in FIG. 9, with delay cells (τ) and summation cells (Σ).

The memorization cells are dedicated to each detector and information memorization occurs before TDI.

Summation takes place in charge simultaneously for the four detectors with the help of a single amplifier.

Each TDI line has switches integrating the current of each detector in a means of storage. Similarly, there is a battery of switches allowing each detector to empty the associated means of storage towards the summation amplifier As. At each frame, a switch located between the detector and the storage transistor Tmos is in the closed position, all the other switches being open. This permits the synchronous integration of all the detectors. Each means of storage is addressed by an appropriate sequencing so as to produce the TDI effect. A description will be given of this sequencing at a later stage.

The reading of another means of storage is carried out simultaneously with the integration in a means of storage.

In the same way, and synchronously for each detector, a switch located between the means of storage and the summation bus is in the closed position, all the others being open. The corresponding storage transistor gate is then pulsed so as to cause the injection of the charges stored on the summation bus. The charge stored in this means of storage is then reset.

It being supposed that the bus column is maintained at a constant potential by the charge amplifier whose input impedance is, moreover, supposed infinite, the current pulse thus caused by injection of the charges is converted into voltage by a summing device which is a charge amplifier. Its output may then be multiplexed towards the video output in order to be processed.

It is now possible to reinitialize the charge amplifier, to open the column addressing device and lastly to create a new potential well, empty of all charge, under the gate of the means of storage before proceeding to the reading of the next line.

The expression of the output voltage variation $\delta Vc_{ij}$ of the charge amplifier connected to column n° j in function of the current $Id_{ij}$ delivered by the detector of elementary circuit n° (i, j) is given by the expression:

$$\delta Vc_{ij} = Id_{ij} \times \text{Texposure}/Ca$$

where Ca is the capacitance of the counter-reaction condenser of the charge amplifier.

The capacitance of the column bus does not intervene in the transfer function of this solution, for it is supposed that the charge amplifier is at differential input and zero input current. No displacement current is derived, the column bus being maintained at a constant potential by this amplifier. In other words, there is conservation of charge in the circuit.

The output voltage variation $\delta Vc_{ij}$ corresponding to the reading of the information delivered by the elementary circuit n(i,j) is thus given by the following relation:

$$\delta Vs_{ij} = As \times \delta Vc_{ij} = As \times Id_{ij} \times \text{Texposure}/Ca$$

where As is the voltage gain of the output voltage amplifier.

The means of storage are dedicated to each detector and the memorization of information is carried out before TDI effect. Summation takes place in charge simultaneously for the four detectors with the help of a single amplifier.

Each TDI line has switches integrating the current of each detector in a means of storage. Similarly, there is a battery of switches allowing each detector to empty the associated means of storage towards the summation amplifier. The architecture of the circuit is represented in FIG. 10.

The expression of the output voltage variation $\delta Vs_L$ of the charge amplifier for the line of detectors nL in function of the diode currents is given by the following relation:

$$\delta Vs_L = \frac{Tint}{Ca} \times \sum_{i=1}^{Ntdi} Ii.i \, (t + 3Tint. \, (i-1))$$

where Tint is the integration time, Ca the capacitance of the condenser of the charge summation amplifier.

In an example embodiment, the working principle of a line of a TDI array is given in FIG. 11.

It is supposed that this circuit reads an array of N lines of M detectors where M is the number of detectors on which the TDI effect is produced. The amplifier outputs of each line are multiplexed by means of a multiplexer of N towards 1.

The electrical plan includes:
detectors: the detectors may, for example, be photovoltaic detectors of type N on substrate P. They are schematized by D1, D2, D3 and D4;
elementary circuits, illustrated in FIG. 12A, and consisting of:
an impedance matching device AI, carried out for example by an MOS transistor, between a detector DET (i, j) and an integration, storage and charge evacuation device,
an integration and storage device Cpel, carried out for example by means of an MOS transistor, whose source and/or drain are connected to the detector via the impedance matching device and whose command is controlled by a clock,
the addressing device, symbolized for purposes of simplification by a switch, carried out for example by an MOS transistor, making it possible to commute the source and/or drain of the storage MOS transistor onto a connection common to the elementary circuits on a same column, called column bus Bcj, in order to evacuate the charges.

A charge amplifier Acj is connected to the end of each column bus BCj (FIG. 12B). The multiplexing of charge amplifier outputs towards one or several output amplifiers As is carried out by means of switches.

At each frame, the switches located between the detectors and the storage MOS transistor are closed synchronously, the switches located between the storage MOS transistors and the column buses Bcj being open.

The current delivered by each detector is then integrated in the inversion channel of the MOS transistor during the duration Texposure.

At the end of the exposure time, the switches located between the detectors and the MOS transistors are opened synchronously. The same exposure time therefore exists for each detector.

The lines of detectors are then selected one after the other. At each time line, the switches of a same line located between the storage MOS transistors and the column buses are closed. The gate of the storage MOS transistors is then pulsed so as to cause the injection of the charges stored in its channel on the column bus and consequently the resetting of the charge stored in the inversion channel of the MOS transistor.

In order to produce the TDI effect on four detectors with a supersampling rate of three, eleven analog memories are required, for detector $n_1$, in order to store sequentially the last eleven frames associated with this detector. In fact, the following summation must be carried out: d1 (i1) +d2 (i4) +d3 (i7) +d4 (i10).

Between detector $n_1$ and detector $n_4$, there is a delay of ten images due to the scanning speed. Consequently the information from detector $n_1$ must be conserved for ten frames before its contribution is added to that of detector $n_4$.

But since it is impossible to integrate the detector current in a storage transistor and at the same time to read the stored charge, a supplementary storage transistor is required in order to integrate image $n_{11}$ and to read image $n_1$.

In point of fact, the storage transistors are filled and then read by circular permutation. The sequencing is given in Tables II and III at the end of this description:

Table II shows the directing of information for storage into the memories in function of the number of the detector and the number of the frame under consideration.

Table III shows the directing of information for rereading in the memories in function of the number of the detector and the number of the frame under consideration.

This description has considered the case of a TDI on four detectors and a supersampling rate of three. But this TDI principle may be applied to any number of detectors and to a variable supersampling rate.

In fact, the following summation must be performed:

$$Stdi = \sum_{d=1}^{Nd} Dd(i + (d-1)\tau)$$

where:
$\tau$ is the supersampling rate,
i is the number of the frame,
Nd is the number of diodes on which the TDI effect is produced.

The number of memorization cells for detector $n_1$ is given by the following relation:

$$N_{ci}=(N_d-i)\tau+2$$

where $N_{ci}$ is the number of memorization cells for detector $n_1$.

In cases where optical scanning is carried out in one direction and in the opposite direction, the device is known as a device with bidirectional TDI effect, and the number of memorization cells differs according to the detector number so as to allow the TDI to be produced in both directions. The number of memorization cells per detector is then as follows:

$$N_{ci}=\text{MAX}\ (N_d-i)\tau+2,\ (6i\ N_d-(N_d-i+1))\ \tau+2)$$

The elementary circuits described in the invention possess the following advantages:
limited number of Tmos transistors in the elementary circuit;
non respect of latch-up and guard rules between Nmos and Pmos;
no need for resetting device.

The following advantages are obtained in terms of linearity, supply rejection and spatial dispersion:

Linearity

The charge integrated in the elementary circuit is converted into voltage by the charge amplifier. Linearity is thus for the most part controlled by the voltage coefficient of the counter-reaction condenser capacitance of the charge amplifier.

This particular kind of condenser is available in systems developed for the production of commuted capacitance-type circuits.

The transfer function of the proposed solution is thus much more linear than:
CDT-type circuits whose transfer efficacy, that is to say input-output attenuation, depends on the transfer number and/or on the charge to be transferred;
commuted tracker-type circuits whose voltage gain is not constant from point to point and/or on all their input deviation;
circuits of the column bus partition type in which the capacitance of the column bus has a high voltage coefficient due to the diode capacitance of the switches connected to it, which said capacitance varies with the quantity of charges read.

Supply and command phase rejection

The proposed solution is far better than that of the commuted trackers for there is no longer any critical supply in the elementary circuit, whether with respect to the reinitialization of the elementary circuit or the supply of the tracker.

Moreover, the potential of each bus is kept constant by the charge amplifier whereas this potential varies enormously in the case of circuits of the commuted tracker or column bus partition type. This characteristic limits the capacitive couplings between the different functions implanted in the elementary circuit. This is an extremely important point in that most electrical nodes of the elementary circuit are of high impedance, and consequently very sensitive, and in that these couplings will increase when the pitch of the detectors lessens.

Finally, it is important to note that in an architecture of elementary circuits such as described here, the means of storage are reinitialized line after line, and not simultaneously as with other solutions, thus keeping the inrush current in the supply to a minimum and relaxing the constraints on the resistances of the supply buses.

Spatial dispersions

In the proposed solution, the dispersions of the technology parameters are not critical in the elementary circuits. It is enough that the charge storable in the storage condenser should be sufficiently large.

The spatial dispersions are essentially controlled by the conversion coefficient of the charge amplifiers. There are thus no dispersions along a same column.

The advantages afforded by this solution, compared to a standard reading circuit, are as follows:

- much more compact layout, leading to greatly improved production output;
- a single amplifier is used for the purpose of reading a line of detectors, thereby eliminating all the problems of dispersion between amplifiers inherent in a standard solution.

The reading circuit of the invention requires no special system. On the contrary, it makes use of analog systems developed for signal processing.

The proposed architecture is compatible with a selective addressing of the detectors of the line. In this way it makes it possible to eliminate detectors with defects or noise excess from the TDI pixel, thereby improving the signal-to-noise ratio of the pixel under consideration.

TABLE I

| Frame N° | CSA 1 | CSA 2 | CSA 3 | CSA 4 | CSA 5 | CSA 6 | CSA 7 | CSA 8 | CSA 9 | CSA 10 | CSA 11 | CSA 12 |
|---|---|---|---|---|---|---|---|---|---|---|---|---|
| i | D1 | | | | | | | | | | | |
| i + 1 | | D1 | | | | | | | | | | |
| i + 2 | | | D1 | | | | | | | | | |
| i + 3 | D2 | | | D1 | | | | | | | | |
| i + 4 | | D2 | | | D1 | | | | | | | |
| i + 5 | | | D2 | | | D1 | | | | | | |
| i + 6 | D3 | | | D2 | | | D1 | | | | | |
| i + 7 | | D3 | | | D2 | | | D1 | | | | |
| i + 8 | | | D3 | | | D2 | | | D1 | | | |
| i + 9 | D4 | | | D3 | | | D2 | | | D1 | | |
| i + 10 | READ | D4 | | | D3 | | | D2 | | | D1 | |
| i + 11 | RESET | READ | D4 | | | D3 | | | D2 | | | D1 |
| i + 12 | D1 | RESET | READ | D4 | | | D3 | | | D2 | | |
| i + 13 | | D1 | RESET | READ | D4 | | | D3 | | | D2 | |
| i + 14 | | | D1 | RESET | READ | D4 | | | D3 | | | D2 |
| i + 15 | D2 | | | D1 | RESET | READ | D4 | | | D3 | | |
| i + 16 | | D2 | | | D1 | RESET | READ | D4 | | | D3 | |
| i + 17 | | | D2 | | | D1 | RESET | READ | D4 | | | D3 |
| i + 18 | D3 | | | D2 | | | D1 | RESET | READ | D4 | | |
| i + 19 | | D3 | | | D2 | | | D1 | RESET | READ | D4 | |
| i + 20 | | | D3 | | | D2 | | | D1 | RESET | READ | D4 |
| i + 21 | D4 | | | D3 | | | D2 | | | D1 | RESET | READ |
| i + 22 | READ | D4 | | | D3 | | | D2 | | | D1 | RESET |
| i + 23 | RESET | READ | D4 | | | D3 | | | D2 | | | D1 |

TABLE II

| | DETECTOR N° 1 | | | | | | | | | | | DETECTOR N° 2 | | | | | | | | DETECTOR N° 3 | | | | | DETECTOR N° 4 | |
|---|---|---|---|---|---|---|---|---|---|---|---|---|---|---|---|---|---|---|---|---|---|---|---|---|---|---|
| FRAME | 1 | 2 | 3 | 4 | 5 | 6 | 7 | 8 | 9 | 10 | 11 | 1 | 2 | 3 | 4 | 5 | 6 | 7 | 8 | 1 | 2 | 3 | 4 | 5 | 1 | 2 |
| 1 | x | | | | | | | | | | | x | | | | | | | | x | | | | | x | |
| 2 | | x | | | | | | | | | | | x | | | | | | | | x | | | | | x |
| 3 | | | x | | | | | | | | | | | x | | | | | | | | x | | | x | |
| 4 | | | | x | | | | | | | | | | | x | | | | | | | | x | | | x |
| 5 | | | | | x | | | | | | | | | | | x | | | | | | | | x | x | |
| 6 | | | | | | x | | | | | | | | | | | x | | | x | | | | | | x |

TABLE II-continued

| FRAME | \multicolumn{11}{c}{DETECTOR N° 1} | \multicolumn{8}{c}{DETECTOR N° 2} | \multicolumn{5}{c}{DETECTOR N° 3} | \multicolumn{2}{c}{DETECTOR N° 4} |

| FRAME | D1-1 | D1-2 | D1-3 | D1-4 | D1-5 | D1-6 | D1-7 | D1-8 | D1-9 | D1-10 | D1-11 | D2-1 | D2-2 | D2-3 | D2-4 | D2-5 | D2-6 | D2-7 | D2-8 | D3-1 | D3-2 | D3-3 | D3-4 | D3-5 | D4-1 | D4-2 |
|---|---|---|---|---|---|---|---|---|---|---|---|---|---|---|---|---|---|---|---|---|---|---|---|---|---|---|
| 7 |  |  |  |  |  |  | x |  |  |  |  |  |  |  |  |  |  | x |  | x |  |  |  |  | x |  |
| 8 |  |  |  |  |  |  |  | x |  |  |  |  |  |  |  |  |  |  | x |  | x |  |  |  |  | x |
| 9 |  |  |  |  |  |  |  |  | x |  |  | x |  |  |  |  |  |  |  |  |  | x |  |  | x |  |
| 10 |  |  |  |  |  |  |  |  |  | x |  |  | x |  |  |  |  |  |  |  |  |  | x |  |  | x |
| 11 |  |  |  |  |  |  |  |  |  |  | x |  |  | x |  |  |  |  |  | x |  |  |  |  | x |  |
| 12 | x |  |  |  |  |  |  |  |  |  |  |  |  |  | x |  |  |  |  |  | x |  |  |  |  | x |
| 13 |  | x |  |  |  |  |  |  |  |  |  |  |  |  |  | x |  |  |  |  |  | x |  |  | x |  |
| 14 |  |  | x |  |  |  |  |  |  |  |  |  |  |  |  |  | x |  |  |  |  |  | x |  |  | x |
| 15 |  |  |  | x |  |  |  |  |  |  |  |  |  |  |  |  |  | x |  |  |  |  |  | x | x |  |
| 16 |  |  |  |  | x |  |  |  |  |  |  |  |  |  |  |  |  |  | x | x |  |  |  |  |  | x |
| 17 |  |  |  |  |  | x |  |  |  |  |  | x |  |  |  |  |  |  |  |  | x |  |  |  | x |  |
| 18 |  |  |  |  |  |  | x |  |  |  |  |  | x |  |  |  |  |  |  |  |  | x |  |  |  | x |
| 19 |  |  |  |  |  |  |  | x |  |  |  |  |  | x |  |  |  |  |  |  |  |  | x |  | x |  |
| 20 |  |  |  |  |  |  |  |  | x |  |  |  |  |  | x |  |  |  |  |  |  |  |  | x |  | x |
| 21 |  |  |  |  |  |  |  |  |  | x |  |  |  |  |  | x |  |  |  | x |  |  |  |  | x |  |
| 22 |  |  |  |  |  |  |  |  |  |  | x |  |  |  |  |  | x |  |  |  | x |  |  |  |  | x |
| 23 | x |  |  |  |  |  |  |  |  |  |  |  |  |  |  |  |  | x |  |  |  | x |  |  | x |  |
| 24 |  | x |  |  |  |  |  |  |  |  |  |  |  |  |  |  |  |  | x |  |  |  | x |  |  | x |
| 25 |  |  | x |  |  |  |  |  |  |  |  | x |  |  |  |  |  |  |  |  |  |  |  | x | x |  |

TABLE III

| FRAME | D1-1 | D1-2 | D1-3 | D1-4 | D1-5 | D1-6 | D1-7 | D1-8 | D1-9 | D1-10 | D1-11 | D2-1 | D2-2 | D2-3 | D2-4 | D2-5 | D2-6 | D2-7 | D2-8 | D3-1 | D3-2 | D3-3 | D3-4 | D3-5 | D4-1 | D4-2 |
|---|---|---|---|---|---|---|---|---|---|---|---|---|---|---|---|---|---|---|---|---|---|---|---|---|---|---|
| 1 |  |  |  |  |  |  |  |  |  |  |  |  |  |  |  |  |  |  |  |  |  |  |  |  |  |  |
| 2 |  |  |  |  |  |  |  |  |  |  |  |  |  |  |  |  |  |  |  |  |  |  |  |  |  |  |
| 3 |  |  |  |  |  |  |  |  |  |  |  |  |  |  |  |  |  |  |  |  |  |  |  |  |  |  |
| 4 |  |  |  |  |  |  |  |  |  |  |  |  |  |  |  |  |  |  |  |  |  |  |  |  |  |  |
| 5 |  |  |  |  |  |  |  |  |  |  |  |  |  |  |  |  |  |  |  |  |  |  |  |  |  |  |
| 7 |  |  |  |  |  |  |  |  |  |  |  |  |  |  |  |  |  |  |  |  |  |  |  |  |  |  |
| 8 |  |  |  |  |  |  |  |  |  |  |  |  |  |  |  |  |  |  |  |  |  |  |  |  |  |  |
| 9 |  |  |  |  |  |  |  |  |  |  |  |  |  |  |  |  |  |  |  |  |  |  |  |  |  |  |
| 10 |  |  |  |  |  |  |  |  |  |  |  |  |  |  |  |  |  |  |  |  |  |  |  |  |  |  |
| 11 | x |  |  |  |  |  |  |  |  |  |  | x |  |  |  |  |  |  |  | x |  |  |  |  | x |  |
| 12 |  | x |  |  |  |  |  |  |  |  |  |  | x |  |  |  |  |  |  |  | x |  |  |  |  | x |
| 13 |  |  | x |  |  |  |  |  |  |  |  |  |  | x |  |  |  |  |  |  |  | x |  |  | x |  |
| 14 |  |  |  | x |  |  |  |  |  |  |  |  |  |  | x |  |  |  |  |  |  |  | x |  |  | x |
| 15 |  |  |  |  | x |  |  |  |  |  |  |  |  |  |  | x |  |  |  |  |  |  |  | x | x |  |
| 16 |  |  |  |  |  | x |  |  |  |  |  |  |  |  |  |  | x |  |  | x |  |  |  |  |  | x |
| 17 |  |  |  |  |  |  | x |  |  |  |  |  |  |  |  |  |  | x |  |  | x |  |  |  | x |  |
| 18 |  |  |  |  |  |  |  | x |  |  |  |  |  |  |  |  |  |  | x |  |  | x |  |  |  | x |
| 19 |  |  |  |  |  |  |  |  | x |  |  | x |  |  |  |  |  |  |  |  |  |  | x |  | x |  |
| 20 |  |  |  |  |  |  |  |  |  | x |  |  | x |  |  |  |  |  |  |  |  |  |  | x |  | x |
| 21 |  |  |  |  |  |  |  |  |  |  | x |  |  | x |  |  |  |  |  | x |  |  |  |  | x |  |
| 22 | x |  |  |  |  |  |  |  |  |  |  |  |  |  | x |  |  |  |  |  | x |  |  |  |  | x |
| 23 |  | x |  |  |  |  |  |  |  |  |  |  |  |  |  | x |  |  |  |  |  | x |  |  | x |  |
| 24 |  |  | x |  |  |  |  |  |  |  |  |  |  |  |  |  | x |  |  |  |  |  | x |  |  | x |
| 25 |  |  |  | x |  |  |  |  |  |  |  |  |  |  |  |  |  | x |  |  |  |  |  | x | x |  |

REFERENCES

[1] "Time Division Multiplexed Time Delay Integration" by R. J. Martin and G. E. Riley (SPIE vol. 930, Infrared Detectors and Arrays, 1988)

[2] "Optimizing Scanning Array Performance using Gain Normalisation and Time Delay Integration (TDI) Pixel Deselection During Readout Hybrid and Focal Plane Testing" by A. D. Adams et al. (SPIE, vol. 1686, Test and Evaluation of IT Detectors and Arrays 1992)

[3] "The Infrared and Electro-Optical Systems Handbook" (volume 3, page 328, SPIE Press)

We claim:

1. A C-MOS type device for reading arrays with TDI effect, comprising:
   an assembly of detector lines. each detector being capable of integrating its own contribution during an integration time, each contribution corresponding to an image in an elementary circuit of a network of elementary circuits, each elementary circuit comprising:
   an impedance matching device;
   an integration and storage device; and
   an addressing device;
   a demultiplexer sequenced in function of the detectors and predetermined image numbers, capable of directing, simultaneously for all the detectors, the contribution of each detector into a first elementary circuit determined by this detector and the predetermined image number of the current image;

a summing device capable of executing the sum of the contribution of the detectors consisting in choosing, for each detector, a second elementary circuit determined in function of the predetermined image number of the current image and of the detector considered and in executing the sum of these elementary circuits so as to carry out the TDI effect on the detectors in such a way as to obtain the contribution of the detector line, wherein the number of memorization cells for detector $n_1$ is given by the following relation:

$$N_{ci}=(N_d-i)\,\tau+2$$

where $N_{ci}$ is the number of memorization cells for detector $n_1$, $N_d$ is the number of diodes on which the TDI effect is produced, $\tau$ is a supersampling rare, and i is an integer.

2. Device according to claim 1, in which the elementary circuits are filled and then read by circular permutation.

3. Device according to claim 1, in which the detectors are quantum detectors.

4. Device according to claim 1, in which the impedance matching device is located between the detector under consideration and the integration and storage device.

5. Device according to claim 4, in which the integration and storage device is carried out by at least one MOS transistor whose source and drain are connected to the detector via a switch and whose gate is controlled by a clock.

6. Device according to claim 5, in which the addressing device makes it possible to commute the source and/or the drain of the MOS transistor onto a connection common to the elementary circuits of a same column, known as a column bus.

7. Device according to claim 6, in which the charge amplifier is connected to the end of each column bus, and the multiplexing of the outputs of the charge amplifiers towards at least one output amplifier is carried out by means of at least one switch.

8. Device according to claim 1, in which the impedance matching device is an MOS transistor.

9. Device according to claim 1, in which the addressing device is an MOS transistor.

10. Device according to claim 9, in which, in the case of a bidirectional TDI device, the number of memorization cells differs according to the detector number so as to allow optical scanning to be carried out in both directions, the number of memorization cells per detector being in such cases as follows:

$$N_{ci}=\text{MAX}\,((N_d-i)\,\tau+2,\,(N_d-i+1))\,\tau+2)$$

where $N_d$ is the number of diodes on which the TDI effect is produced, $\tau$ is a supersampling rate, and i is an integer.

* * * * *